US012201062B2

(12) United States Patent
Schennach et al.

(10) Patent No.: US 12,201,062 B2
(45) Date of Patent: Jan. 21, 2025

(54) METHOD AND DEVICE FOR STRIPPING LEAVES AND OR FLOWERS FROM A STALK

(71) Applicant: Philipp Schennach, Steinmaur (CH)

(72) Inventors: Philipp Schennach, Steinmaur (CH); Raniero Pittini, Biel (CH); Sandra Meier, Balsthal (CH); Pascal André Schnell, Bärschwil (CH); Guido Meyer, Wangen a.A (CH)

(73) Assignee: PHILIPP SCHENNACH, Steinmaur (CH)

( * ) Notice: Subject to any disclaimer, the term of this patent is extended or adjusted under 35 U.S.C. 154(b) by 616 days.

(21) Appl. No.: 17/436,217

(22) PCT Filed: Mar. 5, 2019

(86) PCT No.: PCT/CH2019/000007
§ 371 (c)(1),
(2) Date: Sep. 3, 2021

(87) PCT Pub. No.: WO2020/177002
PCT Pub. Date: Sep. 10, 2020

(65) Prior Publication Data
US 2022/0124978 A1 Apr. 28, 2022

(51) Int. Cl.
*A01D 45/06* (2006.01)
*A24B 5/06* (2006.01)

(52) U.S. Cl.
CPC .............. *A01D 45/065* (2013.01); *A24B 5/06* (2013.01)

(58) Field of Classification Search
CPC ...... A25B 4/06; B27J 3/00; B27J 7/00; B27L 1/125; B27L 1/127
See application file for complete search history.

(56) References Cited

U.S. PATENT DOCUMENTS

| 449,137 A | 3/1891 | Rohr et al. |
| 1,480,825 A * | 1/1924 | Cyril .................... A01D 46/247 |
| | | 56/339 |

(Continued)

FOREIGN PATENT DOCUMENTS

| CA | 2721352 A1 * | 10/2009 | ............. A01D 46/30 |
| CA | 3132220 A1 * | 9/2020 | ............. A01D 45/00 |

(Continued)

OTHER PUBLICATIONS

International Search Report for PCT Application No. PCT/CH2019/000007 dated Nov. 5, 2019.

*Primary Examiner* — Thomas B Will
*Assistant Examiner* — Ashley A Kaercher
(74) *Attorney, Agent, or Firm* — McCormick, Paulding & Huber PLLC

(57) ABSTRACT

The invention relates to a method for stripping leaves and/or flowers from a stalk (1), in particular for stripping *cannabis* leaves and/or *cannabis* flowers from a stalk (1). Thereby, a loop (2) is formed around the stalk (1) to be stripped, which is formed at least in a partial area from flexurally elastic or flexurally slack loop means (3, 3a, 3b) which have tensile strength in the direction of the loop. The stalk (1) is then pulled through the loop (2) in the longitudinal direction of the stalk, with the leaves and/or flowers being stripped from the stalk (1). The invention makes it possible to strip the leaves or flowers, respectively, more easily and directly from the surface of the stalk (1), such that they can be substantially harvested better, faster and with less damage. Less preparatory work is also required.

48 Claims, 17 Drawing Sheets

(56) References Cited

U.S. PATENT DOCUMENTS

| | | | | | |
|---|---|---|---|---|---|
| 1,484,241 | A | * | 2/1924 | Tompkins | A01D 46/247 193/7 |
| 1,539,603 | A | * | 5/1925 | Saprones | B27L 1/127 144/242.1 |
| 2,483,338 | A | * | 9/1949 | Douglas | B27L 1/125 144/208.7 |
| 2,575,422 | A | * | 11/1951 | Laulainen | B27L 1/125 144/208.7 |
| 2,576,127 | A | * | 11/1951 | Nils | B27L 1/125 144/208.7 |
| 2,608,223 | A | * | 8/1952 | Eklund | B27L 1/125 144/208.6 |
| 3,249,140 | A | * | 5/1966 | Jackson | A47G 33/045 47/84 |
| 3,665,602 | A | * | 5/1972 | Salahshourian | H02G 1/1243 30/90.1 |
| 4,149,544 | A | * | 4/1979 | Baraut | A24B 5/00 460/134 |
| 4,282,888 | A | * | 8/1981 | Pinkham | A01D 45/16 56/27.5 |
| 4,353,378 | A | * | 10/1982 | Seymour | A01D 45/16 460/140 |
| 4,386,541 | A | * | 6/1983 | Robertson | G02B 6/245 30/90.1 |
| 4,416,294 | A | * | 11/1983 | Turpin | A01D 45/16 83/697 |
| 4,478,227 | A | * | 10/1984 | McKinney | A24B 1/06 56/27.5 |
| 4,493,330 | A | * | 1/1985 | Price | A01D 45/16 460/134 |
| 4,498,484 | A | * | 2/1985 | Gilbert | A01D 45/16 460/136 |
| 4,509,536 | A | * | 4/1985 | Bennett | A01D 45/16 171/61 |
| 4,836,220 | A | * | 6/1989 | Miyake | A01D 45/16 460/130 |
| 5,044,115 | A | * | 9/1991 | Richardson | A01G 5/00 47/1.01 R |
| 5,177,941 | A | * | 1/1993 | Tharp | A01G 5/00 56/400.01 |
| 5,322,102 | A | * | 6/1994 | Livingston | B27B 33/14 144/208.7 |
| 5,454,300 | A | * | 10/1995 | Rainey | A23N 4/12 99/542 |
| 5,538,302 | A | * | 7/1996 | Travis | B63B 21/54 294/24 |
| D459,166 | S | * | 6/2002 | Harrison, Jr. | D8/1 |
| 7,398,638 | B2 | * | 7/2008 | Malmros | A01D 45/065 56/56 |
| 8,753,180 | B2 | * | 6/2014 | Hutchins | A01D 45/16 460/134 |
| 2012/0329536 | A1 | * | 12/2012 | Scott | A24B 5/02 460/134 |
| 2020/0214336 | A1 | * | 7/2020 | Evans | A24B 5/06 |
| 2022/0124978 | A1 | * | 4/2022 | Schennach | A01D 45/065 |
| 2023/0225249 | A1 | * | 7/2023 | Sullivan | A01D 45/065 56/158 |

FOREIGN PATENT DOCUMENTS

| | | | | |
|---|---|---|---|---|
| CN | 107495436 | A | * | 12/2017 |
| CN | 207784237 | U | * | 8/2018 |
| CN | 207784238 | U | * | 8/2018 |
| CN | 107890135 | B | * | 11/2019 ............ A24B 3/10 |
| DE | 4137366 | A1 | * | 5/1993 ............ B27L 1/127 |
| DE | 102021112710 | A1 | * | 11/2022 |
| FR | 731301 | | * | 9/1932 ............ B27L 1/127 |
| JP | S56127447 | A | | 10/1981 |
| JP | 09191746 | A | * | 7/1997 |
| JP | H09191746 | A | | 7/1997 |
| NL | 1017531 | C2 | * | 9/2002 ............ A01G 3/00 |
| RU | 2791875 | C1 | * | 3/2023 ............ A01D 45/00 |
| WO | WO-9634217 | A1 | * | 10/1996 ............ E04G 5/001 |
| WO | WO-9745573 | A1 | * | 12/1997 |
| WO | WO-2010130035 | A1 | * | 11/2010 ............ A23N 15/01 |
| WO | WO-2018014135 | A1 | * | 1/2018 |
| WO | 2018014135 | A | | 3/2018 |
| WO | WO-2018048503 | A1 | * | 3/2018 |

* cited by examiner

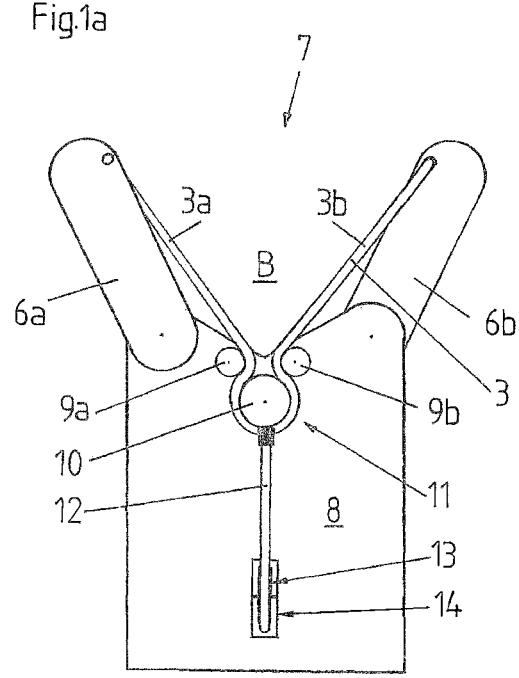

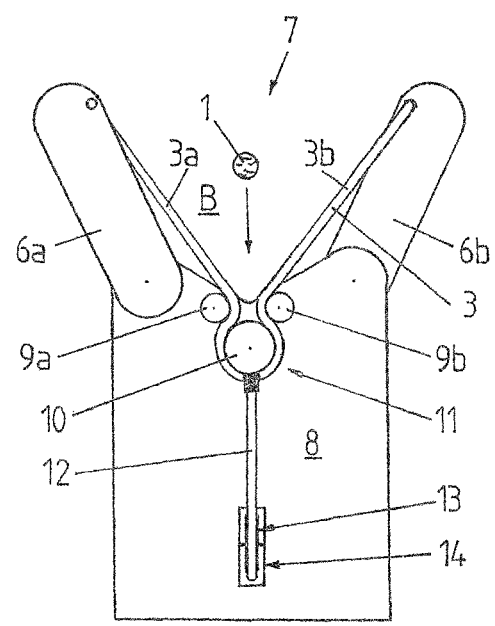

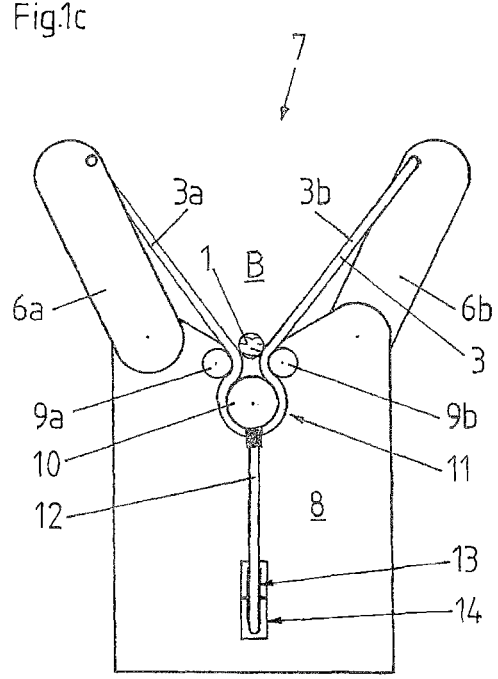

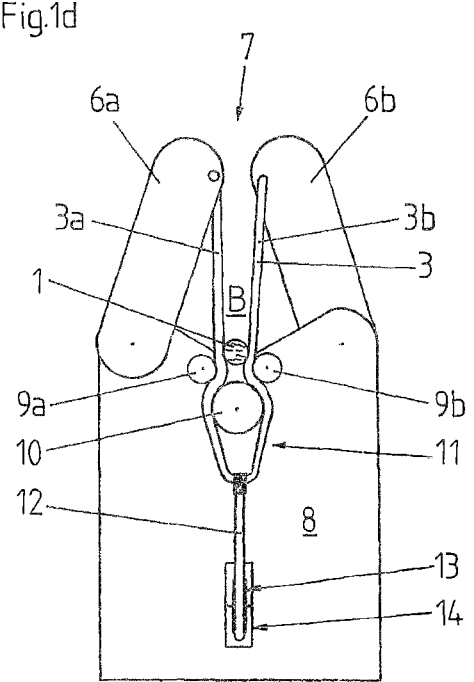

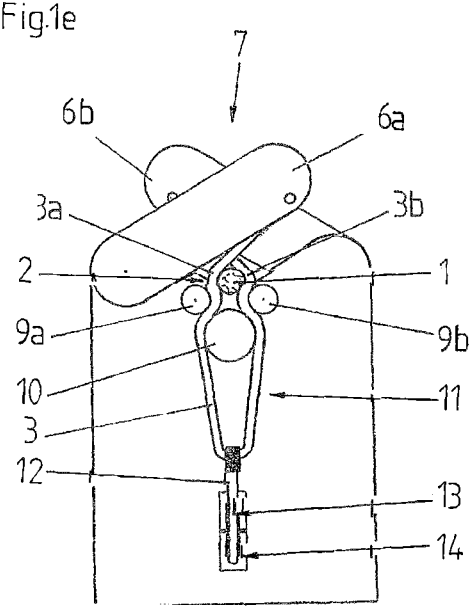

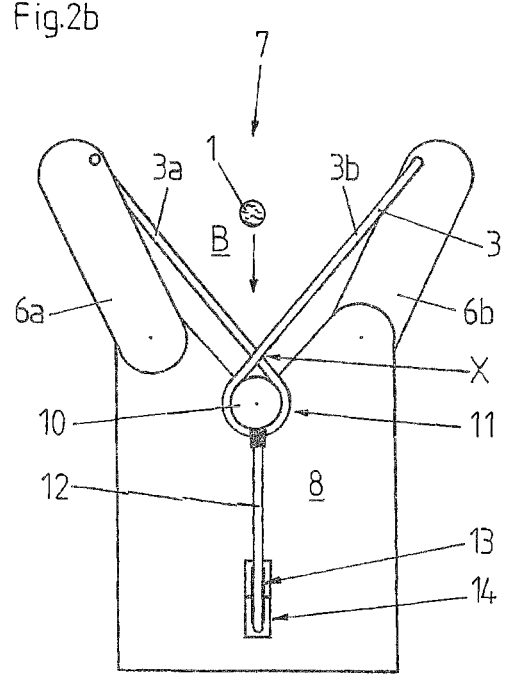

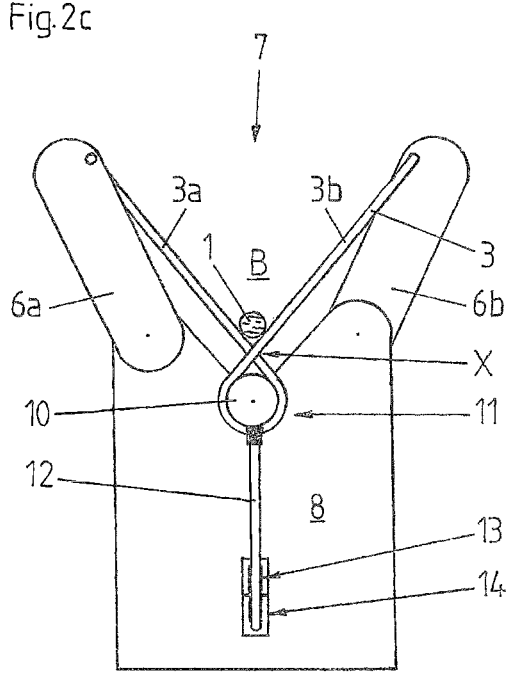

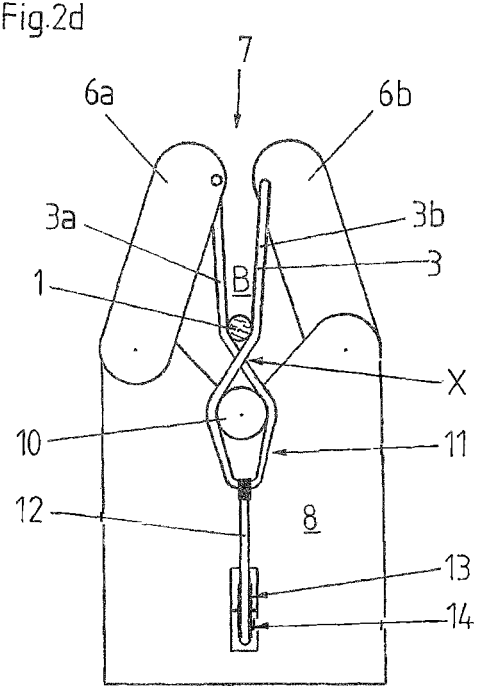

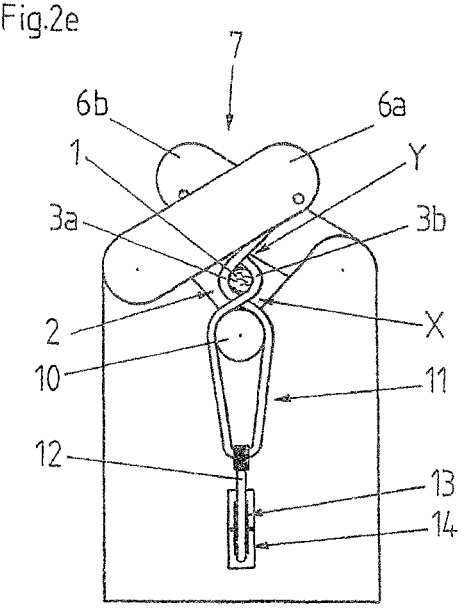

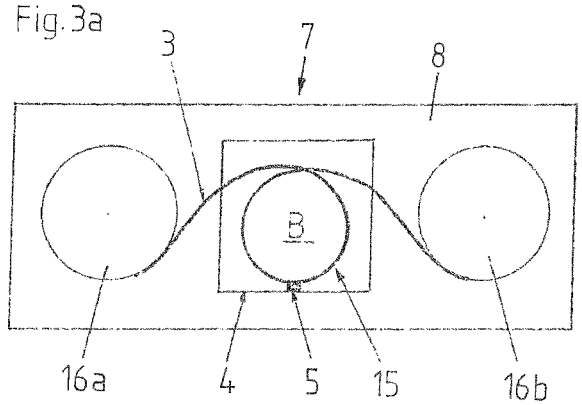
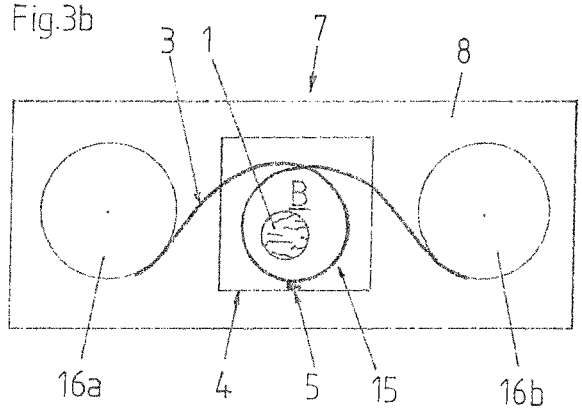

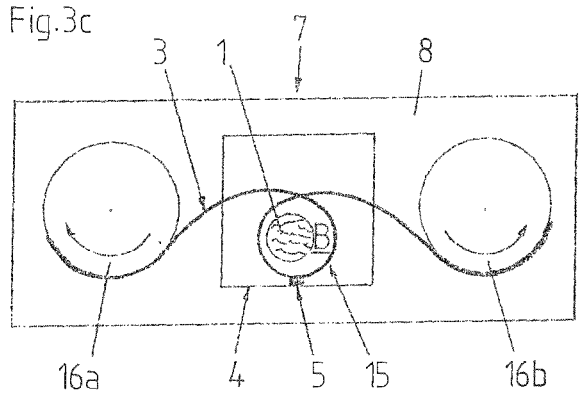
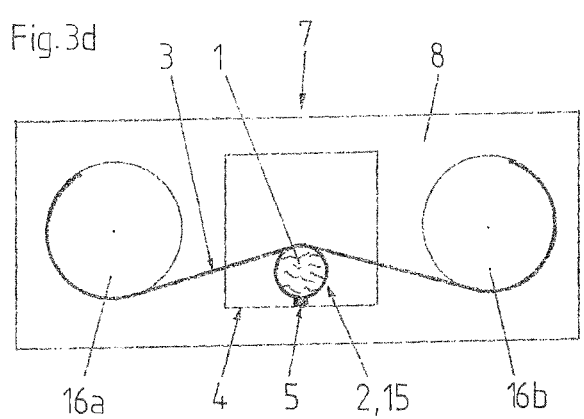

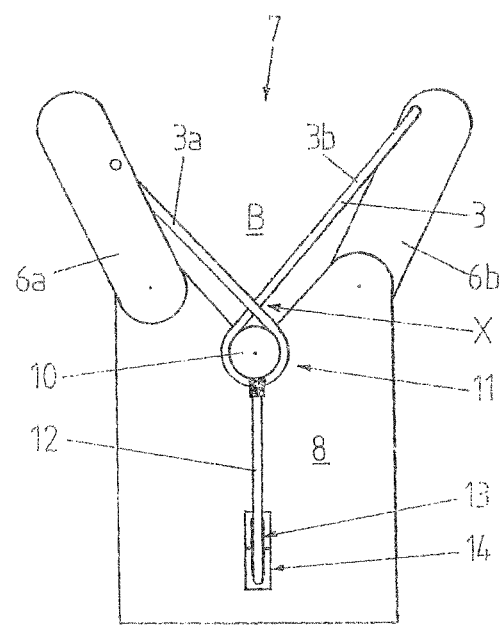

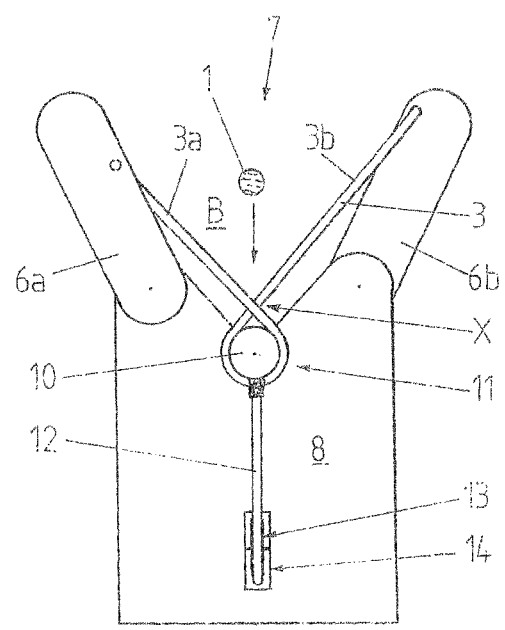

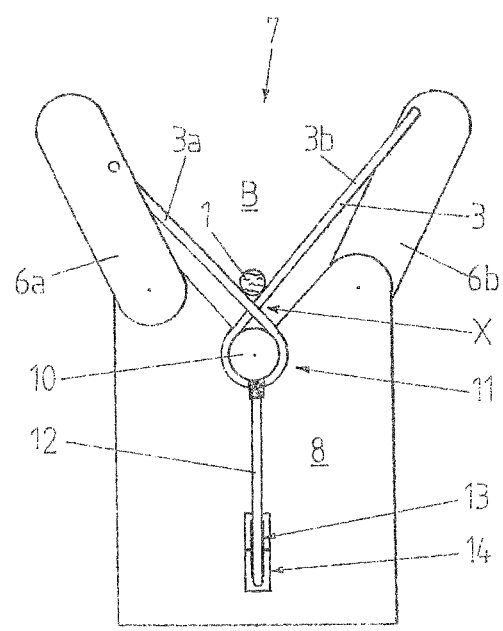

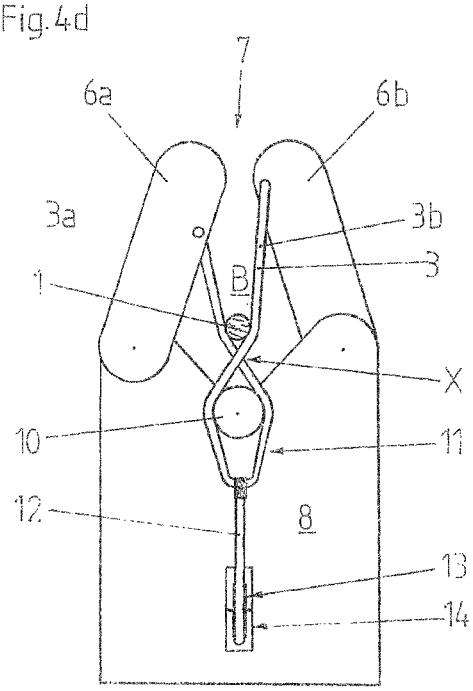

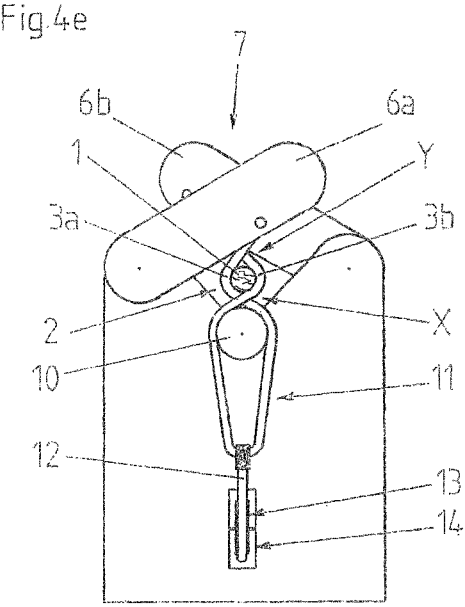

METHOD AND DEVICE FOR STRIPPING LEAVES AND OR FLOWERS FROM A STALK

CROSS-REFERENCE TO RELATED APPLICATIONS

This application is a National Stage application of International Patent Application No. PCT/CH2019/0000007, filed on Mar. 5, 2019, which is incorporated by reference in its entirety.

TECHNICAL FIELD

The present invention relates to a method for stripping leaves and/or flowers from a stalk, a stripping device for use in carrying out the method, an arrangement for carrying out the method comprising such a stripping device, and the use of the stripping device or of the arrangement for stripping leaves and/or flowers from a stalk according to the preambles of the independent patent claims.

BACKGROUND

Rake-like harvesting devices are known from the prior art, with which fruits or leaves are harvested. The stalk or branch carrying the fruits or leaves is thereby placed between two tine-like elements of the harvesting device and the harvesting device is then guided along the stalk or branch so that the fruits or leaves are stripped from the stalk or branch, respectively, by the tine-like elements. Such devices are known, for example, from U.S. Pat. Nos. 5,177,941 A, 1,480,825 A or 1,484,241 A. It is also known to pull individual stalks through a stripping opening in a stripping body of a stripping device, and thus to strip leaves, flowers and/or fruits from the stalk with the boundaries of the stripping opening. Such devices are known, for example, from WO 2018/014135 A1, WO 2018/048503 A1 or JP 3012509 B2.

However, all these known harvesting devices and stripping devices have the disadvantage that, at least when harvesting leaves and flowers, these are torn or torn off the stalk, respectively, with the result that essentially severely damaged leaves or flowers, respectively, are harvested and a substantial part of the usable harvest remains on the stalk and is lost. In the case of stripping devices with stripping openings, a further disadvantage is that insertion of the stalks into the stripping opening requires a relatively high degree of skill and, if there are several stripping openings of different sizes, an additional selection according to stalk thickness is also required.

SUMMARY

The objective is therefore to provide technical solutions that do not have the disadvantages of the state of the art mentioned above or at least partially avoid them, respectively.

This objective is achieved by the subject-matter of the independent patent claims.

According to these, a first aspect of the invention relates to a method for stripping leaves and/or flowers from a stalk, preferably for stripping *cannabis* leaves and/or *cannabis* flowers from a stalk. Thereby, according to the invention, a loop is formed around the stalk, through which the stalk is then pulled in the longitudinal direction of the stalk, while the leaves and/or flowers are stripped from the stalk. The loop, which rests against the surface of the stalk, is formed entirely or at least in a predominant area from flexurally elastic or flexurally slack loop means which have tensile strength in the direction of the loop, such that it can adapt to the particular shape and thickness of the stalk without being circumferentially elastic, however. Suitable flexurally elastic or flexurally slack loop means with tensile strength in the direction of the loop are, for example, cords, ropes or bands made of tensile strong plastics, e.g. or polyamid, or of metal, in particular of stainless steel.

The invention makes it possible to strip the leaves or flowers, respectively, more easily and directly at the stalk surface, so that they can be harvested better, faster and with less damage.

Preferably, while the stalk is being pulled through the loop, a certain tensile force in the direction of the loop is ensured in the loop means such that the loop adapts to the shape and thickness of the respective section of the stalk it is currently looping around and always rests against the surface of the stalk even if the stalk cross-sections change while the stalk is being pulled through the loop.

If the loop is formed exclusively from flexurally elastic or flexurally slack loop means which have tensile strength in the direction of the loop, which is preferred, a uniform contact of the loop means with the surface of the stalk can be achieved over the entire circumference of the stalk.

Thereby, it is preferred in a first variant that the loop is formed by a continuous section of a single loop means, i.e. as a continuous closed loop around the stalks. Such loops are particularly easy to implement, but should preferably be attached to a support structure in the middle of the loop so that they do not tilt in the direction of pull-through while the stalk is pulled through the loop.

In a second variant, it is preferred that the loop is formed by a plurality of separate sections of the flexurally elastic or flexurally slack loop means which have tensile strength in the direction of the loop, or that it comprises a plurality of separate such sections, preferably that it is formed by exactly two separate such sections or comprises exactly two separate such sections which are provided by a single loop means or by a plurality of loop means. The loop is thus subdivided into several partial circumferential areas, which are formed exclusively by separate sections of flexurally elastic or flexurally slack loop means which have tensile strength in the direction of the loop or which can also additionally be formed over a partial area by other elements, e.g. by a rigid component. The sections of the flexurally elastic or flexurally slack loop means can be attached at their two ends, preferably in the vicinity of the stalk, to a supporting structure outside the circumferential area of the loop formed by them, such that a loop results which has a relatively high stability in the direction of pull-through of the stalk or in the longitudinal direction of the stalk, respectively.

Thereby, in a first preferred embodiment of the method, in which the loop is formed partly or completely from flexurally elastic or flexurally slack loop means which have tensile strength in the direction of the loop, the stalk is inserted in the direction of stripping into an area enclosed by the loop means and possibly by additional further elements, e.g. an additional rigid component, and this area is then circumferentially reduced in size by the loop means until the stalk is enclosed by the loop means and the possible additional further elements. For example, a loop is formed from a loop means which is several times larger than the diameter of the stalk, one end of the stalk is then—inserted into this loop in the longitudinal direction of the stalk, and the loop is then tightened until the stalk is looped by the loop means. The stalk is then pulled in the longitudinal direction of the stalk through the thus formed loop, with the leaves and/or flowers being stripped from the stalk.

In a second preferred embodiment of the method, in which the loop is formed partly or completely from flexurally elastic or flexurally slack loop means which have tensile strength in the direction of the loop, the stalk is inserted essentially transversely to the stripping direction into an area partly delimited by the loop means, and this area is then completely enclosed by the loop means and any possible further elements forming the loop, e.g. a rigid component, and circumferentially reduced in size until the stalk is looped by the loop means and the possible further elements. The stalk is then pulled in the longitudinal direction of the stalk through the thus formed loop, with the leaves and/or flowers being stripped from the stalk. The advantage of inserting the stalk end transversely to the longitudinal direction of the stalk or transversely to the stripping direction, respectively, is that it requires very little skill and is also very easy to perform by means of a machine. Less preparatory work is also required.

Preferably, the area into which the stalk is inserted essentially transversely to the stripping direction is formed between two sections of loop means leading away from each other, advantageously from a common starting point. This area is then, after insertion of the stalk, fully enclosed and circumferentially reduced in size by crossing the two sections of the loop means until the stalk is looped by the loop means and any possible further elements forming the loop. For example, two directly successive sections of a loop means are provided in such a way that they form a U-shaped or a V-shaped area, the opening width of which is several times larger than the diameter of the stalk. The stalk is then inserted with one end transverse to the stripping direction or transverse to the longitudinal direction of the stalk, respectively, into the area bounded by the two legs of the U- or V-shape, a loop is formed around the end of the stalk by crossing the free ends of the legs of the U- or V-shape, and the loop is then tightened until the stalk is completely looped by the loop means.

In a preferred variant, the area into which the stalk is inserted essentially transversely to the stripping direction is formed between two sections of loop means—leading away from each other from a common starting point, the common starting point being formed by a point where these sections cross each other. In this way, these sections can be separated from each other, e.g. by further sections of the same loop means which are not involved in the loop, and they can also be formed by separate loop means.

Thereby, it is further preferred that the crossing of the areas of the two sections facing away from the common starting point for looping the stalk takes place in such a way that at this crossing point, viewed in the stripping direction or in the longitudinal direction of the stalk, respectively, there is a sequence of the two sections which is the reverse of the sequence which exists at the crossing point forming the common starting point. In this way, an increased stability results in the stripping direction or longitudinal direction, respectively, and also the advantage results that any possible soiling of the sections of the loop means used for stripping is stripped off by means of the cyclic relative movement of these with respect to one another when the loop is made and removed, such that a kind of self-cleaning effect results.

With an advantage, the crossing of both sections of the loop means for looping the stalk is achieved by a pivoting of two swivel arms, on each of which one end of one of the sections is arranged. In this way, an easy insertion of the end of the stalk is facilitated and a stable guidance of the ends of the loop means can be achieved.

Thereby, the distances between the attachment location of the end of the respective section to the swivel axis of the respective swivel arm can be the same size or different sizes for both swivel arms. In the latter case, especially if the smaller of these distances is less than 80% of the larger of these distances, the advantage results that the ends of the two sections attached to the swivel arms do not meet while crossing over, which significantly reduces the risk of snagging.

It is also preferred that the pivoting of the swivel arms takes place under an overcoming of spring-loaded restoring forces which, in the absence of actuating forces for pivoting the swivel arms, cause the swivel arms to return to the starting position (loading position) in which the two sections of the loop means lead away from each other and thereby form an area between them into which a stalk can be inserted essentially transversely to the stripping direction.

This makes it possible to transmit the actuating forces to the swivel arms for pivoting the swivel arms exclusively via the ends of the sections of the loop means—arranged thereon, in that a tensile force is exerted on these sections of the loop means when the loop is to be produced, and in that this tensile force is released when the loop is to be released or the initial position (loading position) is to be restored, respectively. This actuation variant is preferred because it is easy to implement and an improved self-cleaning effect results from the cyclic longitudinal movement of the sections of the loop means used for stripping, which is particularly pronounced if the starting point of the two sections forming the loop is formed by a crossing point thereof—as previously described as preferred embodiment.

Alternatively, it is possible to transmit the actuating forces to the swivel arms for pivoting the swivel arms not or not exclusively via the ends of the sections of the loop means arranged thereon, whereby it is further preferred that, in the intended operation, a constant or spring-elastic tensile force is exerted advantageously continuously on these sections of the loop means, in particular from a common starting point.

Preferably, cords, ropes or belt materials made of plastic, e.g. polyamide, and/or metal, in particular stainless steel, are used as loop materials. Such loop materials are commercially available by the meter and are correspondingly inexpensive.

Thereby, it is advantageous if the cord, rope or belt material is progressively or in intervals replaced by new corresponding material, i.e. progressively or in intervals shifted in its longitudinal direction such that worn and/or soiled sections are replaced by new ones.

A second aspect of the invention relates to a stripping device for use in carrying out the method according to the first aspect of the invention. The device comprises a stripper for forming a loop around a stalk to be stripped, for stripping leaves and/or flowers from the stalk when the stalk is pulled through the loop in the longitudinal direction of the stalk. The stripper has flexurally elastic or flexurally slack, tensile strong loop means and it is designed in such a way that, in the intended operation, the loop around the stalk is formed by these loop means at least in a partial area. With such a stripping device, it is possible to strip the leaves or flowers, respectively, more easily and directly on the surface of the stalk, so that these can be harvested essentially better, faster and with less damage.

Advantageously, the stripping device comprises devices such as for example tension springs or pneumatic piston/cylinder arrangements with which a certain tensile—force can be ensured in the loop means in the direction of the loop during the pulling through of the stalk through the loop, such that the loop adapts to the cross-section of the section of the stalk it is currently looping around and always bears against the surface of the stalk with a substantially constant force even if the cross-sections of the stalk change while the stalk is being pulled through the loop.

If the stripper of the device is designed in such a way that the loop is formed entirely from loop means which are flexurally elastic or flexurally slack and which have tensile strength in the direction of the loop, which is preferred, then, at least in the case of round cross-sections of the stalk, a uniform contact of the loop means with the surface of the stalk can be achieved over the entire circumference of the stalk.

Thereby, in a first variant, it is preferred that the stripper is designed in such a way that the loop is formed by a continuous section of a single loop means, i.e. it is—formed as a continuous loop around the stalks. Such loops can be realized particularly easily. Advantageously, such a stripper is also designed in such a way that the loop means are attached to a support structure in the middle of the loop so that they do not tilt in the direction of pull-through while the stalk is pulled through the loop.

In a second variant, it is preferred that the stripper is designed in such a way that the loop is formed by or comprises several separate sections, in particular formed by exactly two separate such sections or comprises exactly two separate such sections, which are provided by a single or by a plurality of loop means. The loop is thus subdivided into several partial circumferential areas, which are formed exclusively by separate sections of the flexurally elastic or flexurally slack loop means or may also additionally be formed over a partial area by other elements, e.g. by a rigid component. The sections of the flexurally elastic or flexurally slack loop means can be attached to a supporting structure at their two ends outside the circumferential area of the loop formed by them, preferably in the vicinity of the stalk, such that a loop results which has a relatively high stability in the direction of pull-through of the stalk or in the longitudinal direction of the stalk, respectively.

Thereby, in a first preferred embodiment of the stripping device, the stripper is designed in such a way that, in a loading position, it forms an area enclosed by the loop means and possibly by additional further elements, e.g. an additional rigid component, into which the stalk can be inserted in the intended stripping direction, and that this area can then be circumferentially reduced in size by the loop means when the stalk is inserted until the stalk is looped by the loop means and the possible further elements. For example, the stripper provides a loop of loop means which is several times larger than the diameter of the stalk and which is then tightened when the stalk has been inserted into this loop with one end in the longitudinal direction of the stalk until the stalk is looped by the loop means.

In a second preferred embodiment of the stripping device, the stripper is—designed in such a way that, in a loading position, it forms an area which is partially—delimited by the loop means and into which the stalk can be inserted essentially transversely to the intended stripping direction. When the stalk is inserted, this area can then be completely enclosed by the loop means and potentially by any further elements forming the loop, e.g. a rigid component, and circumferentially reduced in size until the stalk is looped by the loop means and the further possible elements forming the loop. The advantage of the possibility of insertion transversely to the longitudinal direction of the stalk or transversely to the stripping direction, respectively, is that the insertion requires little skill and is also very easy to perform by means of a machine. Less preparatory work is also required.

Preferably, thereby, the stripper is designed in such a way that, in the loading position, it forms an area which is formed between two sections of the loop means which lead away from each other, preferably from a common starting point. This area can then be completely enclosed and circumferentially reduced in size after insertion of the stalk end into it by crossing these two sections of the loop means until the stalk is enclosed by the loop means and any possible further elements forming the loop. For example, the stripper provides two directly successive sections of a loop means in such a way that these form a U-shaped or V-shaped area the opening width of which is several times larger than the diameter of the stalk. The stalk is then inserted with one end transversely to the stripping direction or transversely to the longitudinal direction of the stalk, respectively, into the area delimited by the two legs of the U- or V-shape. The stripper then forms a loop around the end of the stalk by crossing the free ends of the legs of the U- or V-shape and then reduces the loop until the stalk is completely looped by the loop means.

In a preferred variant, the stripper is designed in such a way that the aforementioned area in the loading position is formed between two sections of the loop means leading away from each other from a common starting point, and that this common starting point is formed by a point where the two sections of the loop means cross each—other. In this way, these sections can be separated from each other, e.g. by further sections of the same loop means which are not involved in the loop, and can also be formed by separate loop means.

Thereby, it is further preferred that the stripper is designed in such a way that the crossing of the areas of the two sections facing away from the common starting point takes place in such a way that at this crossing, seen in the stripping direction, there is a sequence of the two sections which is the reverse of the sequence which exists at the—crossing forming the common starting point. This results in an increased stability in the stripping or stalk longitudinal direction, respectively, and also the advantage results that any possible soiling of the sections of the loop means used for stripping is stripped off by the cyclic relative movement of these with respect to one another when the loop is made and removed. This results in a kind of self-cleaning effect.

With an advantage, the stripper comprises two swivel arms, on each of which one end of one of the two sections of the loop means is arranged, and it is designed in such a way that the two sections are crossed over by means of a pivoting of the swivel arms. Such stripper constructions facilitate an easy insertion of the end of the stalk and enable a stable guidance of the ends of the two sections of the loop means.

Thereby, the distances between the attachment location of the end of the respective section to the swivel axis of the respective swivel arm can be the same size or different sizes for both swivel arms. In the latter case, especially if the smaller of these distances is less than 80% of the larger of these distances, the advantage results that the ends of the two sections attached to the swivel arms do not meet while crossing over, which significantly reduces the risk of snagging.

Thereby, it is also preferred that the stripper is designed in such a way that the pivoting of the swivel arms is effected by an overcoming of spring-loaded restoring forces which, in the absence of actuating forces for pivoting the swivel arms, cause the swivel arms to return to the starting position (loading position) in which the two sections of the loop means lead away from each other and thereby form an area between them into which a stalk can be inserted essentially transversely to the stripping direction.

This makes it possible to design the stripper in such a way that the actuating forces for pivoting the swivel arms are transmitted to the swivel arms exclusively via the ends of the sections of the loop means arranged thereon, in that, e.g. from the common starting point, a tensile force is exerted on these sections of the loop means when the loop is to be produced, and this tensile force is released when the loop is to be released or the starting position (loading position) is to be restored, respectively. Such an embodiment of the stripping device is preferred because it is easy to implement and the cyclic longitudinal movement of the sections of the loop means used for stripping results in an improved self-cleaning effect, which is particularly pronounced if the starting point of the two sections forming the loop is formed by a crossing point thereof—as previously described as preferred embodiment.

Alternatively, it is possible to design the stripper in such a way that the—actuating forces for pivoting the swivel arms are not or not exclusively transmitted to the swivel arms via the ends of the sections of the loop means arranged thereon, wherein it is further preferred that, in the intended operation, a constant or spring-elastic tensile force is exerted advantageously continuously on these sections of the loop means, in particular from a common starting point.

Preferably, the stripper comprises cords, ropes or belt materials made of plastic, e.g. polyamide, and/or metal, in particular stainless steel, as loop means. Such loop means are commercially available by the meter and are correspondingly inexpensive.

Thereby, it is advantageous if the stripper is designed in such a way that the cord, rope or belt material is progressively or in intervals replaced by new corresponding material, i.e. is for example progressively or in intervals displaced in its longitudinal direction so that worn and/or soiled sections are replaced by new ones.

A third aspect of the invention relates to an arrangement for carrying out the method according to the first aspect of the invention, which comprises a stripping device according to the second aspect of the invention as well as a drawing-in device for pulling the stalk in the longitudinal direction of the stalk through the loop formed by the stripping device, while stripping the leaves and/or flowers from the stalk. Such arrangements represent a preferred commercial form of the invention.

A fourth and final aspect of the invention relates to the use of the stripping device according to the second aspect of the invention or of the arrangement according to the third aspect of the invention for stripping leaves and/or flowers from a stalk, in particular for stripping *cannabis* leaves and/or *cannabis* flowers from a stalk or hops leaves and/or hops cones from a stalk.

BRIEF DESCRIPTION OF THE DRAWINGS

Further preferred embodiments of the invention are apparent from the dependent claims and from the description which now follows with reference to the figures. Thereby show:

FIGS. 1a-1e front views of a first stripping device according to the invention in various operating states;

FIGS. 2a-2e front views of a second stripping device according to the invention in different operating states;

FIGS. 3a-3d front views of a third stripping device according to the invention in different operating states; and FIGS. 4a-4e front views of a fourth stripping device according to the invention in various operating states.

DETAILED DESCRIPTION

Figure 2A:
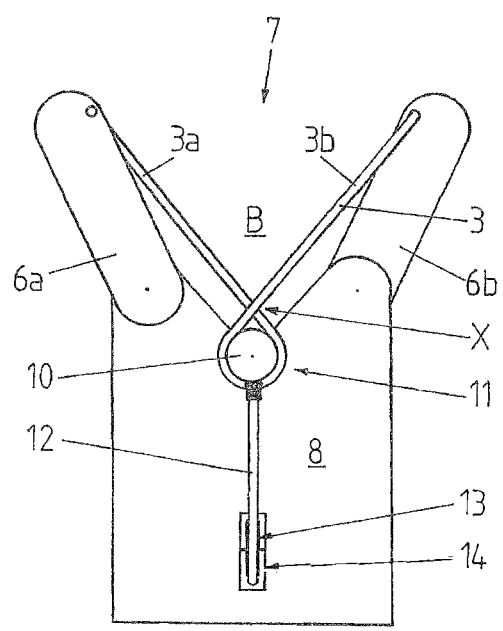

The FIGS. 1a to 1e show front views of a first stripping device according to the invention in various operating states while carrying out the method according to the invention.

As can be seen, the stripping device comprises a support structure 8 in the form of a solid stainless steel plate, which is V-shaped at its upper end and supports two swivel arms 6a, 6b. The swivel arms 6a, 6b are mounted on the plate 8 symmetrically to the V-shape of the upper edge of the plate 8 so that they can be pivoted at a distance from one another, namely the first swivel arm 6a on the front side of the plate 8 and the right swivel arm 6b on the rear side of the plate 8. The swivel arms 6a, 6b are coupled with spring means (not shown) which cause spring-elastic restoring forces to be overcome in order to pivot the swivel arms 6a, 6b towards each other, which forces cause the swivel arms 6a, 6b to return to an initial position (loading position) in the absence of actuating forces for pivoting the swivel arms 6a, 6b. At the free ends of the swivel arms 6a, 6b the ends of a flexurally slack tension-resistant rope 3 (flexurally slack tension-resistant loop means according to the claims) are fastened, namely at the rear side of the left swivel arm 6a and at the front side of the right swivel arm 6b. The rope 3 is formed in its center on the front side of the plate 8 by means of two deflection pulleys 9a, 9b and a retaining pulley 10 below the upper edge of the supporting structure 8 into a downwardly pointing loop 11. At the lowermost point of this loop 11, a drive cable 12 is coupled, which is guided via a deflection pulley 13 and a recess 14 in the plate 8 to a drive (not shown) on the rear side of the plate 8, which can exert a tensile force on the drive cable 12 to actuate the device. The rope 3 is kept under a permanent tensile stress by the spring means of the swivel arms 6a, 6b.

As will be explained in more detail below, a stripper 7 according to the claims is thus provided, with which a loop 2 can be formed around a stalk to be stripped, to enable leaves and/or flowers to be stripped from the stalk 1 when the stalk 1 is pulled through this loop 2 in the longitudinal direction of the stalk.

FIG. 1a shows the stripping device with the stripper 7 in the loading position. As can be seen from FIGS. 1a and 1c, which show the loading of the stripping device with a stalk 1 to be stripped, the stripper 7 in the loading position forms a V-shaped loading area B, which is delimited at the sides by the sections 3a and 3b of the rope 3 separated by the loop 11 and at the base of the V-shape by the upper edge of the plate 8. Since this area is open to the top, the end of the stalk 1 can be inserted into this area B transversely to the intended stripping direction or transversely to the longitudinal direction of the stalk (see FIG. 1b), respectively, until it rests on the upper edge of the plate 8 (see FIG. 1c).

Shortly before or as soon as the end of the stalk 1 comes to rest on the upper edge of the plate 8, a tensile force is exerted on the drive rope 12 by the drive (not shown) which is larger than the restoring force provided by the spring means (not shown) of the swivel arms 6a, 6b, so that the loop 11 is pulled downward and the swivel arms 6a, 6b are pivoted toward each other by the tensile force exerted by the ends of the rope 3 attached thereto (see FIG. 1d). In the process, the sections 3a and 3b of the rope 3 cross over each other, causing the area B in which the stalk 1 is arranged to be completely enclosed and reduced in size until the stalk 1 is enclosed by the rope sections 3a and 3b and the upper edge of the plate 8 (see FIG. 1e).

Now, the stalk 1 is pulled in the longitudinal direction of the stalk through the loop 2 formed in this way and the leaves and/or flowers on it are stripped from the stalk 1. Thereby, the loop 2 follows the decreasing stalk diameter by ensuring via the drive of the drive rope 12 that a specific tensile stress is always present in the pull rope 12 or in the rope 3, respectively, during stripping.

After the stalk 1 has been completely stripped, the tensile force exerted by the drive on the drive rope 12 is removed and the stripper 7 is returned to the loading position shown in FIG. 1a as a result of the restoring forces provided by the spring means of the swivel arms 6a, 6b.

The FIGS. 2a to 2e show front views of a second stripping device according to the invention in various operating states while carrying out the method according to the invention. This stripping device differs from the one according to FIGS. 1a-1e only in that the guiding of the rope 3 in its center and the formation of the loop 11 are carried out differently than in the first stripping device, with the result that the loop around the stalk 1 is formed exclusively with the sections 3a and 3b of the flexurally slack rope 3, i.e. without the involvement of the upper edge of the plate 8. For this purpose, the plate 8 is cut deeper at its upper V-shaped end and the retaining pulley 10 projects upwards beyond the upper edge of the plate 8. The guide pulleys 9a, 9b of the first stripping device are omitted and the rope 3 loops around the retaining pulley 10 in its center to form the loop 11. The sections 3a, 3b of the rope 3 leading away from the retaining pulley 10 cross each other in the area just above the retaining pulley 10.

The loading of this stripping device and its operation and general functioning is identical to that of the first stripping device, which is why reference can be made here to the previous description of FIGS. 1a-1e, which illustrate the procedure in a manner analogous to FIGS. 2a-2e.

As can be seen in particular in FIG. 2e, the crossing direction of the sections 3a, 3b of the rope 3 in the area of the retaining pulley 10 is selected in such a way that, viewed in the stripping direction, there is a reverse order at this crossing point X to that at the crossing point Y, which is formed when looping around the stalk 1. In other words, at the lower crossing point X, section 3b is in front, while at the upper crossing point Y, section 3a is in front.

The FIGS. 3a to 3d show front views of a third stripping device according to the invention in various operating states while carrying out the method according to the invention.

This stripping device comprises a sling 15 made of a flexurally elastic stainless steel cable 3, the ends of which are attached to two circular drive discs 16a, 16b. The drive discs 16a, 16b are rotatably mounted on a support structure 8 and can be rotated in opposite directions by a drive (not shown). The loop 15 is arranged in front of a passage opening 4 of the support structure 8 and is fastened in its center to the support structure 8 by a bar 5.

As will be explained in more detail below, a further stripper 7 according to the claims is provided in this way, with which a loop 2 can be formed around a stalk 1 to be stripped, to enable leaves and/or flowers to be stripped from the stalk 1 when the stalk 1 is pulled through this loop 2 in the longitudinal direction of the stalk.

FIG. 3a shows the stripping device with the stripper 7 in the loading position. As can be seen in conjunction with FIG. 3b, which shows the stripping device being loaded with a stalk 1 to be stripped, the stripper 7 in the loading position forms a loading area B enclosed by the steel cable loop 15, into which the stalk 1 is inserted in the stripping direction or longitudinal direction of the stalk, respectively. In the loading position, this area B has a diameter corresponding to a multiple of the diameter of the stalk.

As soon as the end of the stalk 1 is positioned in the loading area B, the drive discs 16a and 16b are rotated in opposite directions by the drive (not shown) in such a way that the loop 15 contracts and the area B is reduced in size (see FIG. 3c) until the stalk 1 is looped by the rope loop 15 (see FIG. 1e).

The stalk 1 is now pulled through the loop 2 formed in this way in the longitudinal direction of the stalk and the leaves and/or flowers on it are stripped from the stalk 1. In the process, the loop 2 follows the decreasing stalk diameter by ensuring, via the drive of the drive discs 16a, 16b, that there is always a certain tensile stress in the rope 3 during stripping.

After the stalk 1 has been completely stripped, the drive pulleys 16a, 16b are turned back with the drive until the loading position shown in FIG. 3a is reached again.

The FIGS. 4a-4e show front views of a fourth stripping device according to the invention in various operating states while carrying out the method according to the invention. This stripping device differs from that according to FIGS. 2a-2e only in that the distances between the fastening location of the end of the respective section 3a, 3b to the swivel axis of the respective swivel arm are not the same for both swivel arms 6a, 6b, as this is the case with the design according to FIGS. 2a-2e, but that these distances are of different sizes. In the case shown, the distance between the attachment location of the end of section 3a on the swivel arm 6a to its swivel axis is approximately 70% of the distance between the attachment location of the end of section 3b on the swivel arm 6b to its swivel axis.

While preferred embodiments of the invention are described in the present application, it should be clearly noted that the invention is not limited to these and may be carried out in other ways within the scope of the no following claims.

What is claimed is:

1. A method for stripping leaves and/or flowers from a stalk, comprising the steps:
   a) forming of a loop around the stalk, which is formed at least in a partial area from loop means which are flexurally elastic or flexurally slack and have tensile strength in the direction of the loop; and
   b) pulling of the stalk in the longitudinal direction of the stalk through the loop while stripping the leaves and/or flowers from the stalk,
   wherein the stalk is inserted transversely to the stripping direction into an area (B) partially delimited by the loop means and this area (B) is then completely enclosed by the loop means and any possible further elements forming the loop and is circumferentially reduced in size until the stalk is completely or at least for the most part enclosed by the loop means and the possible further elements forming the loop.

2. The method according to claim 1, wherein during the pulling of the stalk through the loop a specific tensile force in the direction of the loop is ensured in the loop means.

3. The method according to claim 1, wherein the loop is formed exclusively from loop means which are flexurally elastic or flexurally slack and have tensile strength in the direction of the loop.

4. The method according to claim 3, wherein the loop is formed by a continuous section of a single loop means.

5. The method according to claim 1, wherein the loop is formed by several separate sections, which are provided by one or more loop means.

6. The method according to claim 5, wherein the several separate sections comprise two separate sections.

7. The method according to claim 1, wherein the stalk is inserted transversely to the stripping direction into an area (B) which is formed between two sections of the loop means leading away from each other, and wherein this area (B) is then completely enclosed and circumferentially reduced in size by crossing these two sections of the loop means until the stalk is enclosed by the loop means and the possible further elements forming the loop.

8. The method according to claim 7, wherein the stalk is inserted transversely to the stripping direction into an area (B) formed between two sections of the loop means leading away from each other from a common starting point (X), and wherein this common starting point (X) is formed by a point at which the two sections cross.

9. The method according to claim 8, wherein the crossing of the areas of the two sections facing away from the common starting point (X) takes place in such a way that at this crossing (Y) there is a sequence of the two sections viewed in the stripping direction which is the reverse of the sequence which is present at the crossing forming the common starting point (X).

10. The method according claim 7, wherein the crossing of the two sections is effected by a pivoting of two swivel arms, on each of which one end of one of the two sections is arranged.

11. The method according to claim 10, wherein the distances between the attachment location of the end of the respective section to the swivel axis of the respective swivel arm are equal for both swivel arms.

12. The method according to claim 10, wherein the pivoting of the swivel arms takes place under the overcoming of spring-elastic restoring forces which, in the absence of actuating forces for pivoting the swivel arms, effect a returning of the swivel arms into a loading position in which the two sections of the loop means lead away from each other, thereby forming an area (B) between them into which a stalk can be inserted substantially transversely to the stripping direction.

13. The method according to claim 10, wherein the actuating forces for pivoting the swivel arms are transmitted to the swivel arms exclusively via the ends of the sections of the loop means arranged thereon, by means of exerting a tensile force on these sections of the loop means.

14. The method according to claim 10, wherein the actuating forces for pivoting the swivel arms are not or not exclusively transmitted to the swivel arms via the ends of the sections of the loop means arranged thereon.

15. The method according to claim 14, wherein a constant or spring-elastic tensile force is continuously exerted on said sections of the loop means.

16. The method according to claim 14, wherein a constant or spring-elastic tensile force is continuously exerted on said sections of the loop means from a common starting point (X).

17. The method according to claim 10, wherein the distances between the attachment location of the end of the respective section to the swivel axis of the respective swivel arm are different for both swivel arms, and wherein the smaller of said distances is less than 80% of the larger of said distances.

18. The method according to claim 10, wherein the actuating forces for pivoting the swivel arms are transmitted to the swivel arms exclusively via the ends of the sections of the loop means arranged thereon, by means of exerting the tensile force on the sections of the loop means from a common starting point (X).

19. The method according to claim 7, wherein the two sections of the loop means lead away from each other at a common starting point (X).

20. The method according to any claim 1, wherein a cord, a rope or a band material made of plastic and/or metal is used as a loop means.

21. The method according to claim 20, wherein the cord, rope or band material is progressively or in intervals replaced with new corresponding material.

22. The method according to any claim 20, wherein the metal is stainless steel.

23. A stripping device for use in carrying out the method according to claim 1, comprising a stripper for forming a loop around a stalk to be stripped for stripping leaves and/or flowers from the stalk when the stalk is pulled through the loop in the longitudinal direction of the stalk, wherein the stripper has flexurally elastic or flexurally slack loop means which have tensile strength in the direction of the loop and wherein it is designed in such a way that, in the intended operation, the loop around the stalk is formed by these loop means at least in a partial area,
wherein the stripper is designed in such a way that in a loading position it forms an area (B) which is partially delimited by the loop means and into which the stalk can be inserted transversely to the intended stripping direction, and that this area (B) can then, when the stalk is inserted, be completely enclosed by the loop means and any possible further elements forming the loop and circumferentially reduced in size until the stalk is enclosed by the loop means and the possible further elements forming the loop.

24. The stripping device according to claim 23, wherein the device has means with which, in the intended operation when the stalk is pulled through the loop, a certain tensile force in the direction of the loop can be ensured in the loop means.

25. The stripping device according to claim 23, wherein the stripper is designed in such a way that, in the intended operation, the loop around the stalk is formed exclusively from loop means which are flexurally elastic or flexurally slack and which have tensile strength in the direction of the loop.

26. The stripping device according to claim 25, wherein the stripper is designed in such a way that, in the intended operation, the loop around the stalk is formed by a continuous section of a single loop means.

27. The stripping device according to claim 25, wherein the stripper is designed in such a way that, in the intended operation, the loop is formed by several separate sections, which are provided by one or more loop means.

28. The stripping device according to claim 27, wherein the several separate sections comprise two separate sections.

29. The stripping device according to claim 23, wherein the stripper is designed in such a way that in the loading position it forms an area (B) which is formed between two sections of the loop means leading away from each other, and that this area (B) can then be completely enclosed and circumferentially reduced in size by crossing these two sections of the loop means until the stalk is looped by the loop means and the possible further elements forming the loop.

30. The stripping device according to claim 29, wherein the stripper is designed in such a way that in the loading position it forms an area (B) which is formed between two sections of the loop means leading away from each other from a common starting point (X), and that the common starting point (X) is formed by a point at which the two sections of the loop means cross each other.

31. The stripping device according to claim 30, wherein the stripper is designed in such a way that the crossing of the areas of the two sections facing away from the common starting point (X) takes place in such a way that at this crossing (Y), viewed in the stripping direction, there is a sequence of the two sections which is the reverse of the sequence which is present at the crossing (X) forming the common starting point (X).

32. The stripping device according to claim 29, wherein the stripper comprises two swivel arms on each of which one end of one of the two sections is arranged, and wherein the stripper is designed in such a way that the crossing of the two sections can be effected by a pivoting of the swivel arms.

33. The stripping device according to claim 32, wherein the distances between the attachment location of the end of the respective section to the swivel axis of the respective swivel arm are equal for both swivel arms.

34. The stripping device according to claim 32, wherein the stripper is designed in such a way that the pivoting of the swivel arms is effected by overcoming spring-elastic restoring forces which, in the absence of actuating forces for pivoting the swivel arms, effect a returning of the swivel arms into a loading position in which the two sections of the loop means lead away from each other, thereby forming an area (B) between them into which a stalk can be inserted transversely to the stripping direction.

35. The stripping device according to claim 32, wherein the stripper is designed in such a way that the actuating forces for pivoting the swivel arms are transmitted to the swivel arms exclusively via the ends of the sections of the loop means arranged thereon, by means of exerting a tensile force on these sections of the loop means.

36. The stripping device according to claim 32, wherein the stripper is designed in such a way that the actuating forces for pivoting the swivel arms are not or not exclusively transmitted to the swivel arms via the ends of the sections of the loop means arranged thereon.

37. The stripping device according to claim 32, wherein the stripper is designed in such a way that the actuating forces for pivoting the swivel arms are transmitted to the swivel arms exclusively via the ends of the sections of the loop means arranged thereon, by means of exerting the tensile force on the sections of the loop means from a common starting point.

38. The stripping device according to claim 32, wherein the stripper is designed in such a way that the actuating forces for pivoting the swivel arms are not or not exclusively transmitted to the swivel arms via the ends of the sections of the loop means arranged thereon, and, in the intended operation, a constant or spring-elastic tensile force is continuously exerted on these sections of the loop means.

39. The stripping device according to claim 32, wherein the stripper is designed in such a way that the actuating forces for pivoting the swivel arms are not or not exclusively transmitted to the swivel arms via the ends of the sections of the loop means arranged thereon, and, in the intended operation, a constant or spring-elastic tensile force is continuously exerted on these sections of the loop means from a common starting point.

40. The stripping device according to claim 32, wherein the distances between the attachment location of the end of the respective section to the swivel axis of the respective swivel arm are different for both swivel arms, and wherein the smaller of said distances is less than 80% of the larger of said distances.

41. The stripping device according to claim 29, wherein the area (B) formed between the two sections of the loop means leading away from each other is from a common starting point (X).

42. The stripping device according to claim 23, wherein the stripper comprises a cord, a rope or a band material made of plastic and/or metal, as loop means.

43. The stripping device according to claim 42, wherein the stripper is configured such that the cord, rope or band material is progressively or in intervals replaced with new corresponding material.

44. The stripping device according to claim 42, wherein the metal is stainless steel.

45. An arrangement for carrying out the method according to claim 23, comprising:
a stripping device comprising a stripper for forming a loop around a stalk to be stripped for stripping leaves and/or flowers from the stalk when the stalk is pulled through the loop in the longitudinal direction of the stalk, wherein the stripper has flexurally elastic or flexurally slack loop means which have tensile strength in the direction of the loop and wherein it is designed in such a way that, in the intended operation, the loop around the stalk is formed by these loop means at least in a partial area; and
a drawing-in device for pulling the stalk in the longitudinal direction of the stalk through the loop formed by the stripping device while stripping the leaves and/or flowers from the stalk.

46. The use of the stripping device comprising a stripper for forming a loop around a stalk to be stripped for stripping leaves and/or flowers from the stalk when the stalk is pulled through the loop in the longitudinal direction of the stalk, wherein the stripper has flexurally elastic or flexurally slack loop means which have tensile strength in the direction of the loop and wherein it is designed in such a way that, in the intended operation, the loop around the stalk is formed by these loop means at least in a partial area or the arrangement according to claim 45 for stripping leaves and/or flowers from a stalk.

47. The use of the stripping device comprising a stripper for forming a loop around a stalk to be stripped for stripping leaves and/or flowers from the stalk when the stalk is pulled through the loop in the longitudinal direction of the stalk, wherein the stripper has flexurally elastic or flexurally slack loop means which have tensile strength in the direction of the loop and wherein it is designed in such a way that, in the intended operation, the loop around the stalk is formed by these loop means at least in a partial area or the arrangement according to claim 45 for stripping *cannabis* leaves and/or *cannabis* flowers from a stalk.

48. The method according to claim 1, wherein the method is for stripping *cannabis* leaves and/or *cannabis* flowers.

\* \* \* \* \*